INVENTORS.
ROBERT L. BAIR &
JOHN F. KELLY
BY
Meyer, Tilberry & Body
ATTORNEYS

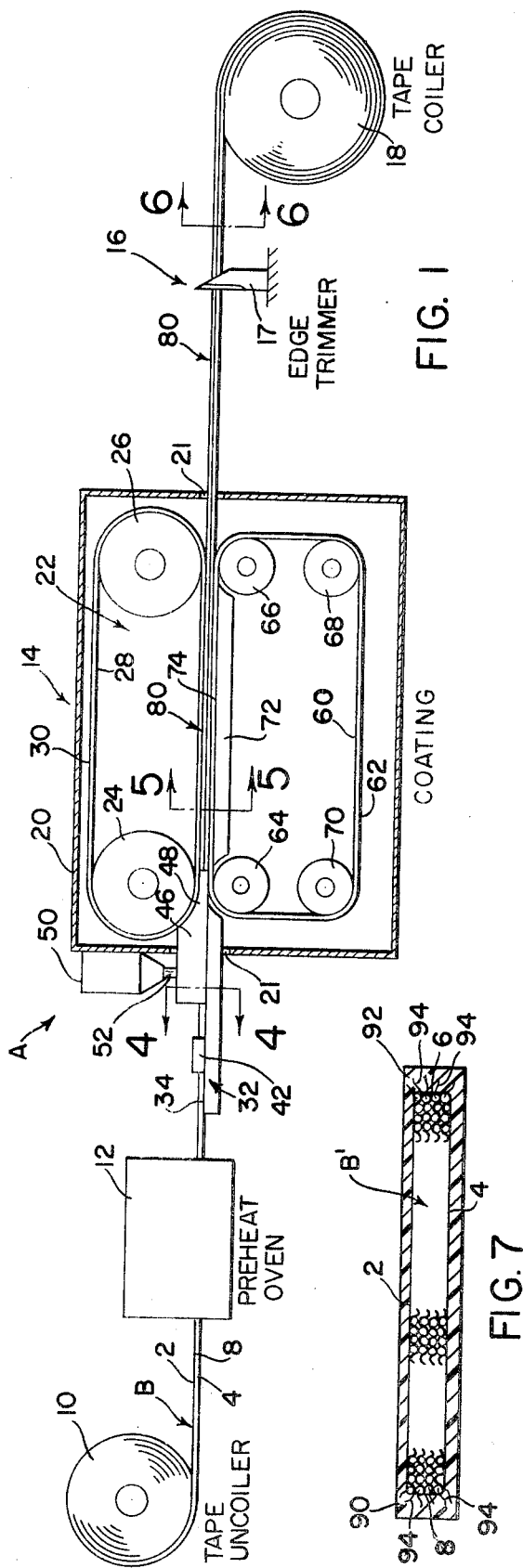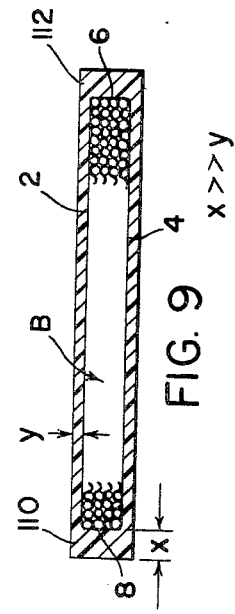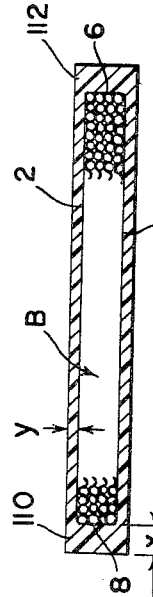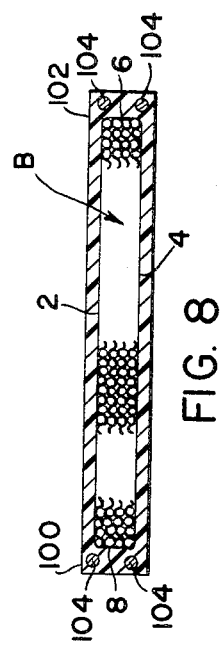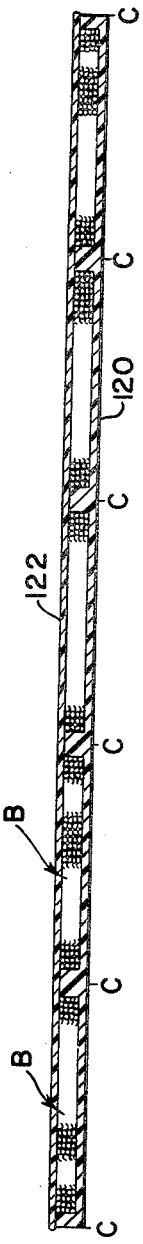

INVENTORS.
ROBERT L. BAIR &
JOHN F. KELLY
BY
Meyer, Tilberry & Body
ATTORNEYS

United States Patent Office 3,513,231
Patented May 19, 1970

3,513,231
APPARATUS AND METHOD FOR COATING A FLAT WOVEN TAPE AND COATED TAPE PRODUCED THEREBY
Robert L. Bair, Ashland, N.J., and John F. Kelly, Broomall, Pa., assignors to E. W. Bliss Company, Canton, Ohio, a corporation of Delaware
Filed Sept. 30, 1966, Ser. No. 583,212
Int. Cl. B64c 25/68; B64f 1/02
U.S. Cl. 264—171
6 Claims

ABSTRACT OF THE DISCLOSURE

The invention disclosed is a method of making flat woven tape such as the tape used in aircraft arresting gear and aircraft launching gear. A tape is initially heated and conveyed to a coating station. The plastic coating material is also heated to a temperature above that of the tape. When the coating is applied it is passed to a mold cavity where the coating flows over the top surface of the tape and down the edges and forms a thick coating on the edge, substantially thicker than the desired thickness. The coated tape is then cured.

---

This invention pertains to the art of flat woven tape, such as the tape used in aircraft arresting gear and aircraft launching gear, and more particularly to a method for coating a flat woven tape and the coated tape produced thereby.

The invention is particularly applicable to applying an abrasion-resistant coating of polyurethane onto a high tensile strength, flat woven nylon tape of the type used in aircraft arresting and launching gear, and it will be described with particular reference thereto; however, it will be appreciated that the invention has much broader applications and may be used for applying various other plastic coatings onto other similar flat woven tapes, such as conveyor belting.

A high tensile strength, woven tape, as used herein, refers primarily to a tape of the general type described and claimed in U.S. Letters Patent No. Re. 25,406 by Byrne et al. This tape comprises a plurality of longitudinal and transverse strands woven together to form a tight elongated, high tensile strength unit which can withstand the forces created on the tape of an aircraft arresting or launching gear.

In recent years considerable effort has been devoted to the development and installation of aircraft arresting gears for use on both commercial and military runways. These gears stop, or arrest, the forward movement of an aircraft during landing or an aborted take-off, thus, preventing the injury to passengers and damage to aircraft which can result from over-shooting the end of a runway. Many arresting gear designs have been suggested; however, the only design presenting satisfactory operating characteristics includes a cable, or pendant, stretched across the runway to engage an aircraft, a rotatable reel on one side or both sides of the runway, a flat woven tape wound onto the reel and connected to the ends of the pendant, and an energy absorbing unit connected onto the reel to retard rotation thereof when the tape is payed-out by an aircraft engaging the pendant and pulling it down the runway. Since the woven tape is pulled by the aircraft down the runway, the surface of the runway tends to abrade the tape. During repeated use of the arresting gear, this abrasion of the tape can cause substantial damage to the tape. For this reason, the tape or tapes of the aircraft arresting gear must be periodically replaced.

To overcome the disadvantages of exaggerated tape wear during use, it has been suggested that an abrasion-resistant coating of plastic material be applied onto the surfaces of the tape. The application of this abrasion-resistant coating has heretofore required a considerable time, and the coating did not have a uniform, controlled thickness on the surfaces of the tape.

The present invention is directed primarily toward a method for applying abrasion-resistant plastic coating onto a flat woven tape of the type used in aircraft arresting and aircraft launching gear which method results in a superior coating and does not require a long processing time.

In accordance with one aspect of the present invention, there is provided an apparatus for applying a plastic coating onto a flat woven tape having an upper surface, a lower surface, a thickness $t$ and a width $w$ as the tape is travelling along a given path. The apparatus comprises a mold passage having an upper and a lower curing surface extending for a selected distance along the path. The curing surfaces are separable from the plastic, at least after it has been partially cured, and the curing surfaces are generally parallel with the upper and lower surfaces of the tape. The upper curing surface of the apparatus is spaced from the upper surface of the tape a distance $y$ which is generally equal to the desired thickness of the coating. There is also provided means for moving the curing surfaces at a speed generally matching the speed of the tape as it moves along the path until the coating is at least partially cured to allow separation of the curing surfaces from the coating.

By constructing the coating apparatus as mentioned above, both surfaces against which the plastic coating is cured are movable with the tape so that these surfaces do not resist movement of the coated tape during the curing process. After the plastic coating is partially cured, the coating is easily releasable from the moving curing surfaces and is easily handled for subsequent processing. Accordingly, one aspect of the present invention is the provision of an apparatus for moving the surfaces against which the coating is cured as the curing takes place without changing the spacing of these surfaces.

In accordance with a more limited aspect of the present invention, the curing surfaces of the apparatus defined above are endless belts formed from a non-stick material, such as Teflon. After the coating has been cured, or partially cured, while moving with the endless belts, the endless belts can be easily moved away from the coating material without tending to pull the material from the moving tape. In this manner, the coating material remains with the moving tape, and the movable belts are easily separated therefrom.

In accordance with another aspect of the present invention, there is provided a method for applying a plastic coating onto a flat woven tape having an upper surface and a lower surface while the tape is travelling longitudinally along a predetermined path. This method comprises: heating the tape to a given temperature; heating the plastic material in an uncured condition to a temperature slightly above the given temperature; applying the heated, uncured plastic material onto the heated tape so that the tape allows the plastic material to flow into the interstices of the tape which is contacted by the material to effect optimum conditions for adhesion; conveying the coated tape through a curing passage which maintains the plastic material at the desired thickness of the tape; and, curing the plastic material, at least partially, in this passage.

By utilizing the above defined method, the plastic material applied to the woven tape is somewhat cooled at the surface of the tape. This prevents the coating material, apparently, from entering the main body of the woven tape and affecting the tensile strength of the tape.

In accordance with still another aspect of the present invention, there is provided a method for applying a plastic coating onto a flat woven tape having an upper surface, a lower surface and two opposed edges while the tape is travelling along a predetermined path. This method comprises: conveying the tape along the predetermined path on a continuous support belt; applying an uncured plastic material onto the upper surface of the tape, allowing the uncured material to flow over the edges to form a heavy edge coating; curing the material, at least partially; and, maintaining the thickness of the coating on the upper surface substantially uniform during this curing process.

By applying a plastic coating onto a woven tape in accordance with the above-defined methods, a heavy body of plastic material is formed at the opposed edges of the woven tape. Since the most detrimental abrasions of the tape take place at the edges, this heavy body of plastic material substantially increases the operating life of the tape by prolonging the time required to abrade the coating from the edges of the tape.

In accordance with a further aspect of the present invention, there is provided an improvement in a high tensile strength tape comprising interwoven longitudinal and transverse strands forming a unit having an upper surface, a lower surface, and opposed edges and a cured plastic abrasion-resistant coating over the unit. This coating covers the surfaces with a thickness $y$ and the edges with a thickness $x$. This improvement comprises providing the thickness $x$ substantially greater than the thickness $y$. In this manner, a heavier coating is provided adjacent the edge portion of the tape than is provided over the flat surfaces of the tape. As mentioned above, this prolongs the useful life of the tape during successive arrestments of an aircraft.

The primary object of the present invention is the provision of a method for applying an abrasion-resistant coating onto a flat woven tape, which method produces a more uniform coating thickness.

Another object of the present invention is the provision of a method for applying an abrasion-resistant coating onto a flat woven tape which method allows the formation of a contoured heavy body of coating material adjacent the edges of the tape.

Still another object of the present invention is the provision of a method for applying an abrasion-resistant coating onto a flat woven tape which apparatus and method reduced the time required to coat the tape.

Still another object of the present invention is the provision of a method of producing a high tensile strength, flat woven tape coated with an abrasion-resistant material which coating is heavier at the edges of the tape.

Still a further object of the present invention is the provision of a method of producing a high tensile strength, flat woven tape coated with an abrasion-resistant material which coating is heavier at the edges of the tape and includes reinforcing elements in the edge portions.

These and other objects and advantages will become apparent from the following description used to illustrate the preferred embodiments of the invention as read in connection with the accompanying drawings in which:

FIG. 1 is a side elevational view illustrating, somewhat schematically, the preferred embodiment of the present invention;

Figure 4:
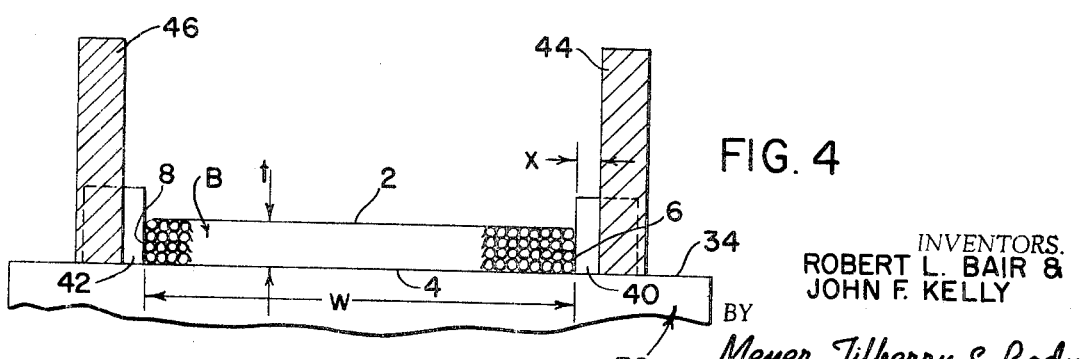
Figure 5:
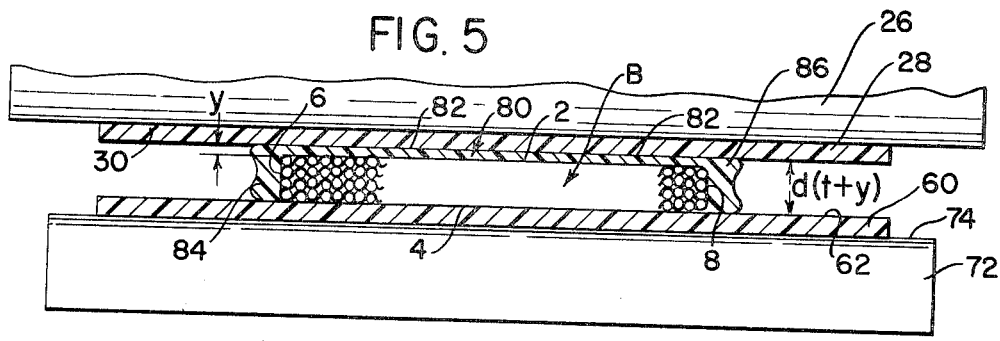
Figure 6:
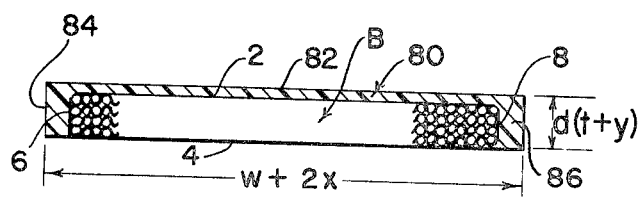
Figure 4A:
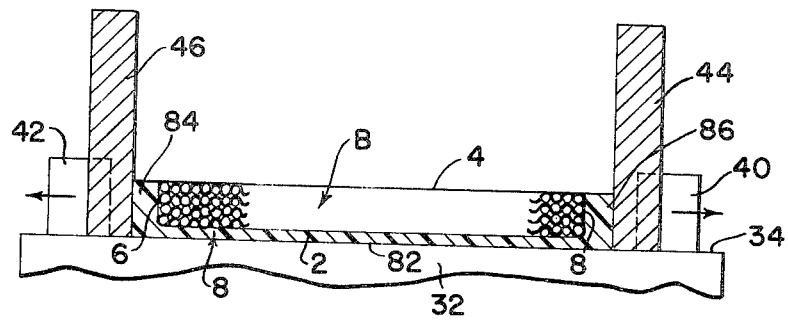
Figure 5A:
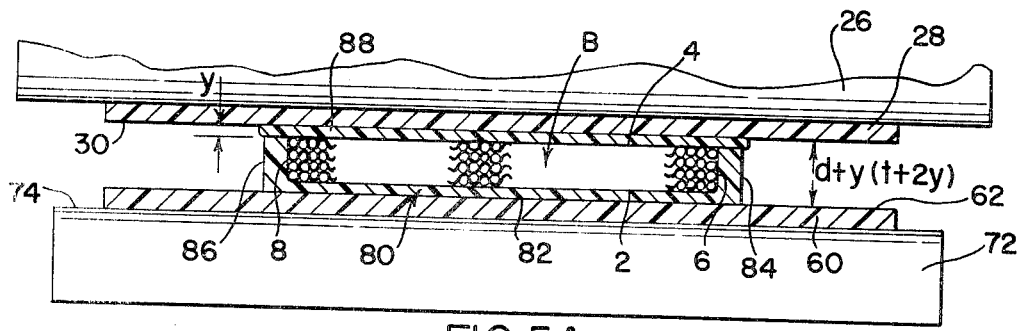
Figure 6A:
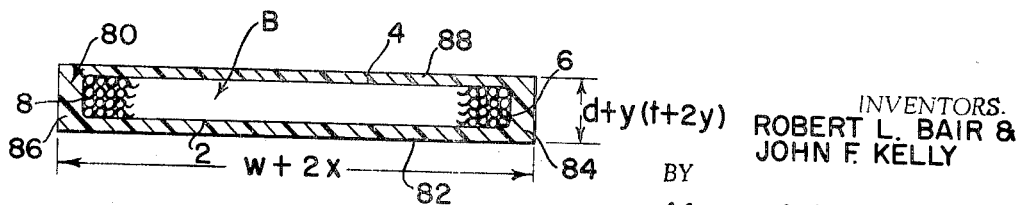

FIGS. 4, 5 and 6 are enlarged cross-sectional views taken generally along lines 4—4, 5—5, and 6—6, respectively, of FIG. 1 when processing the first side of the tape;

FIGS. 4A, 5A, and 6A are enlarged cross-sectional views taken generally along lines 4—4, 5—5, and 6—6, respectively, of FIG. 1 when processing the second side of the flat woven tape;

FIGS. 7, 8 and 9 are enlarged cross-sectional views illustrating coated woven tape having various modifications, but constructed in accordance with the present invention; and, FIG. 10 is a cross-sectional view illustrating a plurality of flat woven tapes coated simultaneously in accordance with the present invention.

Referring now to the drawings wherein the showings are for the purpose of illustrating preferred embodiments of the invention only and not for the purpose of limiting same, FIG. 1 shows apparatus A for applying an abrasion-resistant coating onto a flat woven tape B, of the type used in aircraft arresting and launching gear. The flat tape B has a flat upper surface 2, a flat bottom surface 4, and oppositely extending, generally parallel edges 6, 8. In a manner to be hereinafter described, a curable plastic material, such as polyether based polyurethane is applied to the afore-mentioned surfaces and edges to completely encapsulate the woven tape B.

Although a variety of structural embodiments could be utilized for practicing the present invention, FIG. 1 illustrates only a schematic apparatus. In accordance with the illustrated embodiment, apparatus A includes a tape uncoiler 10, a preheating oven 12, a coating station 14, which station forms the primary aspect of the present invention, an edge trimmer 16 having transversely spaced blades 17, and a tape coiler 18. In operation, the tape B is unreeled from uncoiler 10 and then passed through the preheating oven 12. Tape is heated to a preselected temperature. This dries the tape and prevents formation of air or steam bubbles during the coating process. Thereafter, the tape passes through coating station 14 where a plastic, abrasion-resistant material, such as polyether based polyurethane is applied to the exposed surfaces of the tape. The tape is then passed between the blades 17 of trimmer 16 to trim the coated tape to the proper width. This coated tape is then coiled onto the coiler 18. Only one flat surface of tape B is coated during one pass through apparatus A; therefore, after the tape passes through the apparatus the first time, it is turned over and again placed on uncoiler 10 for passage through the apparatus again. This applies the plastic coating material onto the previously uncoated flat surface of the tape.

Figure 2:
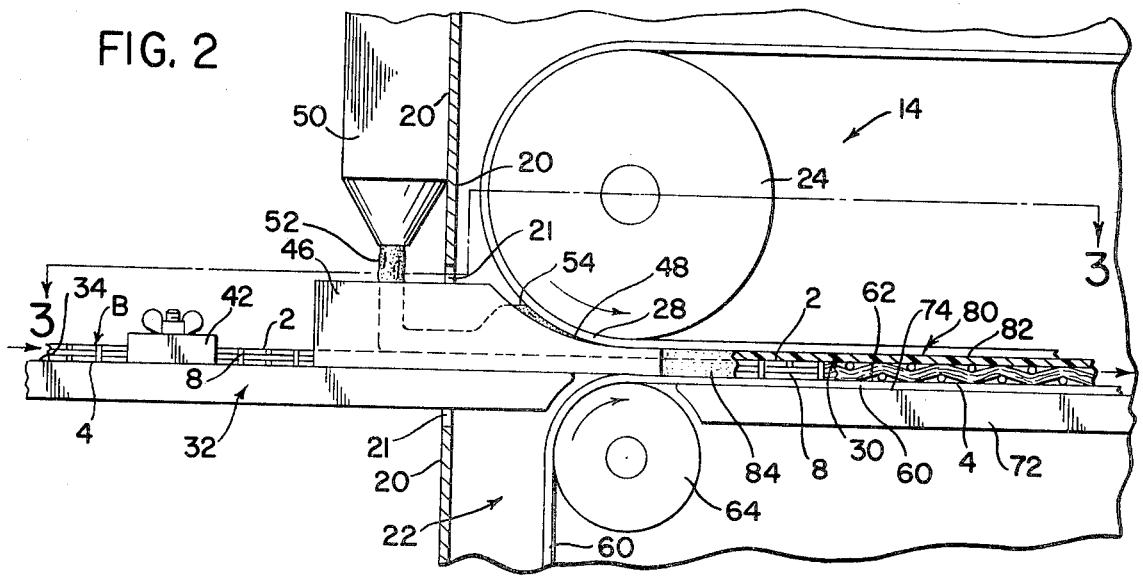
FIG. 2 is an enlarged partial view showing a portion of the invention as illustrated in FIG. 1.
Figure 3:
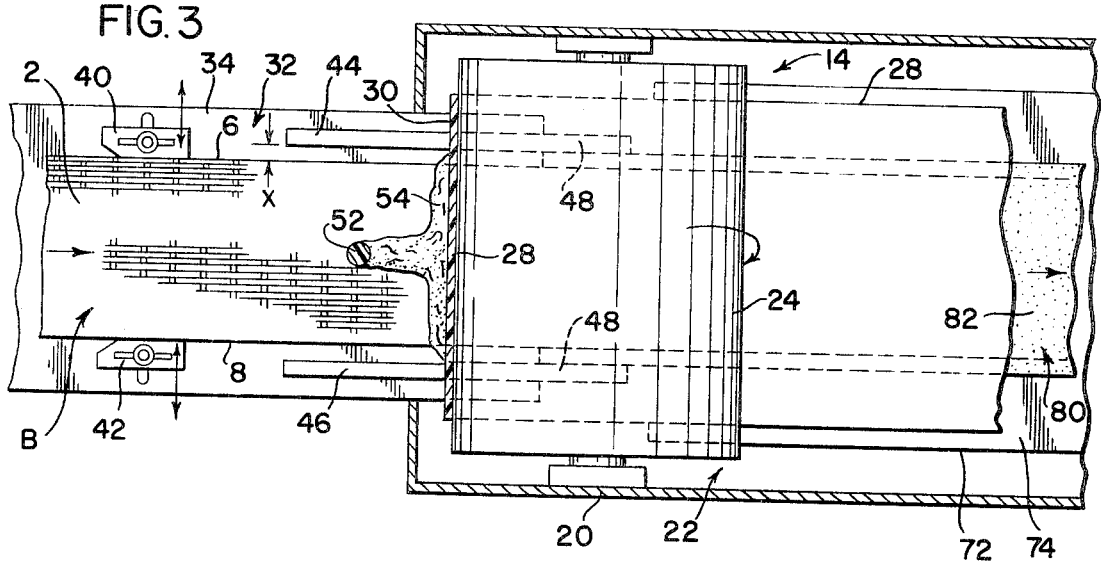
FIG. 3 is a top plan view taken generally along line 3—3 of FIG. 2.

Referring now to FIGS. 1–3, the coating station 14 includes an outer housing 20 with openings 21 for passage of the tape B. The housing 20 defines a chamber 22 which is heated to the proper curing temperature for the plastic material being coated onto the tape. The temperature may vary; however, when polyurethane is used to coat the tape and the tape is moving at 3–7 feet per minute, the chamber 22 is heated to a temperature of approximately 250° F. The length of chamber 22 is sufficient to at least partially cure the coating material so that it retains its shape. Within chamber 22 there are provided spaced rollers 24, 26 around which there is entrained an endless belt 28. This endless belt has an outer, flat surface 30 formed from a smooth layer of Teflon, or a similar non-stick material. It has been found that such non-stick material will release polyether based polyurethane after this coating material has been partially cured. Before this material is cured it will adhere to even Teflon. The surface speed of belt 28 is synchronized with the surface speed of tape B; therefore, surface 30 moves with the tape until tthe coating material has been partially cured, in a manner to be described later. At that time, the belt 28 moves around roll 26 and pulls itself from the cured, or partially cured, plastic material forming the coating on tape B.

Coating station 14 also includes, in advance of roller 24, a support table 32 with an upper flat surface 34. The tape B rides along this surface as it approaches roller 24. To assure that the tape B is centered with respect to roller 24, there are provided transversely movable, centering blocks 40, 42, best shown in FIG. 3. As the width of the tape B varies the blocks 40, 42 may be moved transversely to maintain the tape centered. Between the centering blocks and roller 24 there are provided guide members, or side walls 44, 46. These members include contoured noses 48 which extend, as a projection of surface 34, to a position below the roller 24. In this manner, the guide members, or side walls, 44, 46 form a receptacle and continuous molding elements for the uncured plastic coating material being fed onto the upwardly exposed surface of tape B by an appropriate dispenser 50.

The dispenser 50 includes an appropriate mechanism for mixing the plastic coating material and maintaining the necessary temperature of this material. The coating material, designated as 52, is deposited onto the upwardly facing surface of tape B where it is carried toward the roller 24. This forms a bank 54 of coating material, as best shown in FIG. 2. The dispenser 50 is adjusted so that the proper amount of coating material is continuously fed into bank 54 during operation of coating station 14. In practice, the dispenser 50 includes means for mixing polyether based polyurethane with an activator, such as the activator sold under the trade name Moca, which is added in the proper proportion to provide the required chemical consistency for the plastic material within the bank 54. In practice, the temperature of the material 52 is controlled so that it is slightly higher than the temperature of the preheated tape B as it passes into opening 21. Consequently, as the heated plastic material is deposited onto the moving tape, it is quickly cooled to form a somewhat less fluid interface on the plastic material. In this manner, the material does not enter the main body of the woven tape B which could possibly affect the tensile strength of the tape. The temperature differential between the preheated tape and the heated plastic material is approximately 20–40° F. in practice. However, it is appreciated that various other temperature differentials could accomplish the abovementioned function.

To support tape B as it moves along a horizontal path, there is provided a lower endless belt 60 having an outwardly facing, generally flat surface 62 formed from Teflon, or a similar non-stick material. This endless belt is entrained around spaced rollers 64, 66, 68 and 70, and it is driven at a speed generally corresponding to the speed of the tape B. To prevent a catenary between rollers 64, 66 a lower support 72 is provided with an upwardly facing flat surface 74. This flat surface allows the belt 60 to support the tape B as it is moving through the chamber 22. The surfaces 30, 62 define a generally uniform molding or curing passage through which the coated tape B passes. Since the spacing of the belts remains uniform, the thickness of the coating on the upwardly facing surface of tape B remains constant while the coating is being cured. It is also possible to provide some type of support above the belt 28 to maintain the uniformity in the spacing between the two moving belts. Since the belts 28, 60 are moving in unison through the heating chamber 22, the coating material is partially cured before the belts are pulled away from the tape. Consequently, the partially cured coating material on the tape B will have the desired thickness imparted thereto before it leaves the rearward opening 21 of housing 20.

Referring now to FIGS. 4–6, the operation of coating station 14, during the first pass of tape B, is illustrated. The tape B has a thickness $t$ and a width $w$. Centering blocks 40, 42 are moved inwardly to center tape B between guide members 44, 46. The spacing between the tape edges 6, 8 and the guide members 44, 46 is represented as $x$. It is appreciated that the spacing $x$ may be different at opposite edges of the tape. After the material in bank 54 is deposited onto the upper surface 2 of tape B, it forms a coating 80 on the top surface 2 and the edges 6, 8. The general form of the coating 80 is illustrated in FIG. 5 wherein the material on the upper surface 2 is designated 82, and the material along the edges 6, 8 is designated 84, 86, respectively. It is noted that the edge portions 84, 86, respectively are somewhat defined by the inner walls of guide members 44, 46, respectively; however, it is appreciated that the coating 80 leaves the influence of the guide members before it is cured. For this reason, the edge portions 84, 86 have a certain amount of viscous droop which in practice is minimized by optimizing the stoichiometry of prepolymer and activator to realize rapid gel time. The guide members 44, 46 are used to roughly delineate the thickness of the coating 80 adjacent the parallel edges 6, 8.

The thickness of the upper coating portion 82 is defined by the spacing between surfaces 30, 62 which is designated $d$. As appears in FIG. 5, $d=(t+y)$ wherein the thickness of the tape is $t$. The width of the tape is generally equal to the width of the tape $w$, plus the spacing of guide members 44, 46 from the edges of the tape. If this latter mentioned spacing is equal, the width of the coated tape will be approximately $(w+2x)$. As illustrated in FIG. 6, after the coated tape passes the trimmer 16, the edge portions 84, 86 are trimmed so that the width of the tape is generally $(w+2x)$ within a specified tolerance. Of course, the spacing of trimming knives 17 determines the final width of the coated tape; therefore, this width may vary substantially from that illustrated in FIG. 6 without departing from the intended scope of the present invention.

In practice, the heating chamber 22 has an internal or ambient temperature which only partially cures plastic material 80. This temperature, when the material is polyether based polyurethane is approximately 250° F. with the tape moving through the chamber at 3–7 feet/minute. Partial curing of the coating 80 on surface 2 is sufficient to impart finality to the shape of the coating; however, when the tape surface 4 is subsequently coated, the coating on surface 2 is cured with the new coating on surface 4. This substantially eliminates interface bonding difficulties and avoids a seam between the coating material applied during the first and second pass of tape B through the apparatus A.

Referring now to FIGS. 4A, 5A and 6A, the tape illustrated in FIG. 6 is shown during the second pass through apparatus A. During the second pass of the tape, the uncoated surface 4 is disposed in an upward direction. This is shown in FIG. 4A. The guide members 44, 46 center the tape B within the coating station 14. Centering blocks 40, 42 are retracted, as shown in FIG. 4A. Thereafter, the tape is passed through the molding passage defined by surfaces 30, 62. By moving rollers 24, 26 upwardly a distance $y$, the spacing between these surfaces is now $(d+y)$. This allows coating portion 88 to be applied upon surface 4 with a thickness $y$. Thickness $y$ generally corresponds with the thickness of coating portions 82. As the tape B progresses along with belts 28, 60, the coating portion 88 on surface 4 is partially cured while the coating portions 82, 84 and 86 are fully cured. This provides a seamless bond between the coating materials on the upper and lower portions of the tape B. The resulting structure is illustrated in FIG. 6A. The tape B is again passed between trimming knives 17 which size the upper layer of plastic coating material. The latent heat of the tape and its coating ultimately finalizes the curing of coating portion 88.

In practice, when polyether based polyurethane is used as a coating material, it has been found that a representative material has a viscosity at approximately 85° F. of 10,000–15,000 cps. before it is applied to the upper surface of the tape. When applied to the upper surface, which is slightly cooler, the viscosity of the coating material increases to a value in the range of 20,000–35,000 cps. within a few seconds. Consequently, the coating material within bank 54 is somewhat tacky and flows gradually over the edges of the tape during the first pass of the tape through the coating station. This provides a heavy coating along the parallel edges of the tape.

By applying the coating 80 onto tape B by the apparatus and method described above, a relatively heavy, accurately controlled coating is applied around the edges of the tape. Consequently, as the tape is abraded against the surface of a runway, a longer time is required to wear through the coating along the edges of the tape B. Accordingly, one advantage of the above-described apparatus and method is the provision of the heavy edge coating on the woven tape; however, by slight modifications, other similar advantages are obtained. For instance, if the edge portions 90, 92, as shown in FIG. 7 were applied onto a tape B' having a plurality of outwardly extending elements 94, these elements would combine with the edge coating to provide a reinforced coating. The elements 94 may be fibers extending from the edge of the tape or metal elements secured onto the tape. In this manner, the edge portions 90, 92 can be reinforced so that the time required to wear through the coating is substantially increased. A reinforced similar structure is illustrated in FIG. 8 wherein the edge portions 100, 102 include longitudinally extending metal wires 104. These wires may be fed along the edges of the tape as it passes into the coating station 14 of apparatus A during the first pass. Of course, other arrangements could be provided for reinforcing the controlled heavy edge portion of the tape coating.

Referring now to FIG. 9, the edge portions 110, 112 have a thickness $x$. This dimension has been previously discussed. In practice, the dimension $x$ is in the range of 3–500 mils while the dimension $y$ is in the range of 3–50 mils. Preferably, the dimension $x$ is in the range of 40–250 mils while the dimension $y$ is in the range of 5–15 mils. In practice, it has been found that the dimension $x$ should be at least three times the distance $y$ and, preferably, at least 10 times the distance $y$. In one example of a tape produced for use in an arresting gear, the distance $x$ is 10 mils and the distance $y$ is 250 mils. Various other combinations of these two distances can be provided within the teaching of the present invention to provide a controlled heavier coating at the edges of the tape.

Referring now to FIG. 10, the apparatus A is well adapted to produce a plurality of tapes B coated simultaneously while in side-by-side relationship. As illustrated, the first pass through apparatus A applies coating 120, and the second pass applies the cover coating 122. After the composite unit shown in FIG. 10 leaves the coating station 14, it is moved through a trimmer having a plurality of knives located at positions $c$ across the width of the composite unit. These knives slit and trim the composite unit to form a plurality of separate coated woven tapes having the desired edge and surface coatings.

The present invention has been described in connection with a variety of embodiments; however, it should be appreciated that various changes may be made in these embodiments without departing from the intended spirit and scope of the present invention as defined in the appended claims.

Having thus described our invention, we claim:
1. A method for applying a coating of plastic material onto a synthetic, flat woven tape of the type used in aircraft arresting gear and having an upper surface, a lower surface, and two spaced edges and travelling longitudinally along a predetermined path, said method comprising the following steps:
  (a) heating said tape to a given temperature;
  (b) heating said plastic material in uncured condition to a temperature slightly above said given temperature;
  (c) applying said heated upper surface of said uncured material to said heated tape whereby said tape cools said material at the surface of said tape and prevents said material from flowing into said tape;
  (d) conveying said coated tape through a mold cavity which maintains said material at the desired thickness on said tape wherein said material applied to said upper surface flows over said edges of said tape into an edge surrounding mold with walls spaced transversely from said respective edges a distance greater than said desired thickness to form an edge coating on said tape substantially thicker than said desired thickness, and
  (e) curing said plastic material, at least partially, in said passage.

2. A method for applying a coating of heat curable plastic material onto a synthetic flat woven tape of the type used in aircraft arresting gear, said tape having an upper surface, a lower surface, two generally parallel edge portions, a thickness $t$ between said surfaces, and a width $w$ between said portions, said method comprising the following steps:
  (a) providing an elongated mold passage extending along a predetermined path and defined by a first generally flat surface and a moving continuous belt generally parallel to said first flat surface, said belt and said surface being spaced a controlled distance $d$ which is equal to $t+y$, wherein $y$ is the desired thickness of coating on said upper surface, said passage having an entrant end;
  (b) driving said belt at a preselcted linear speed;
  (c) conveying said tape through said mold passage at the same linear speed as said belt with said upper surface facing said belt whereby said belt and tape move in unison;
  (d) mixing said plastic material and a curing activator into a mixture having a viscosity of at least about 10,000 cps.;
  (e) depositing said mixture onto said upper surface where it flows over said upper surface;
  (f) providing side guides at said passage entrant end, said guides being spaced a distance $w+2x$ and extending between said first flat surface and said moving belt to restrict transverse flow of said mixture at said edge portions of said tape $x$ being at least three times $y$, whereby a substantially heavier coating is formed adjacent said edge portions than on said upper surface;
  (g) guiding said tape through said passage with said edge portions being generally spaced from the respective side guides a distance approximately $x$; and,
  (h) heating said tape and said mixture as it passes through said passage and adjacent said entrant end.

3. The method as defined in claim 2 wherein $x$ is in the general range of 40–250 mils and $y$ is in the general range of 5–15 mils.

4. The method as defined in claim 2 wherein said material is a polyether based polyurethane.

5. The method as defined in claim 2 wherein $x$ is at least 10 times $y$.

6. The method as defined in claim 2 wherein said tape is preheated prior to said conveying step.

References Cited

UNITED STATES PATENTS

| | | | |
|---|---|---|---|
| 2,928,756 | 3/1960 | Campbell | 117—47 |
| 2,926,100 | 2/1960 | Weigle et al. | 117—41 |
| 3,392,938 | 7/1968 | Cruger et al. | 244—110 |
| 3,278,667 | 10/1966 | Knox | 117—112 X |
| 3,124,476 | 3/1964 | Park et al. | 117—47 X |
| 2,928,756 | 3/1960 | Campbell | 117—47 X |
| 2,894,855 | 7/1959 | Wilhelm et al. | 156—87 |
| 2,526,318 | 10/1950 | Battin | 118—59 X |

ALFRED L. LEAVITT, Primary Examiner

A. GRIMALDI, Assistant Examiner

U.S. Cl. X.R.
117—47; 244—110